US012633153B1

(12) United States Patent
Loret de Mola et al.

(10) Patent No.: US 12,633,153 B1
(45) Date of Patent: May 19, 2026

(54) ADAPTIVE PROCESS FOR MULTI-INDUSTRY DOCUMENT ANALYSIS, DATA EXTRACTION, AND BLOCKCHAIN TOKENIZED ASSET TRACKING

(71) Applicant: dataXtrax Inc., Wainscott, NY (US)

(72) Inventors: Patricia Maria Loret de Mola, Wainscott, NY (US); Joseph Colaprico, Wainscott, NY (US)

(73) Assignee: dataXtrax, Inc., Wainscott, NY (US)

( * ) Notice: Subject to any disclaimer, the term of this patent is extended or adjusted under 35 U.S.C. 154(b) by 0 days.

(21) Appl. No.: 19/300,898

(22) Filed: Aug. 15, 2025

Related U.S. Application Data

(60) Provisional application No. 63/683,379, filed on Aug. 15, 2024.

(51) Int. Cl.
    *G06V 30/413*     (2022.01)
    *G06V 10/764*     (2022.01)
    *G06V 10/94*     (2022.01)

(52) U.S. Cl.
    CPC .......... *G06V 30/413* (2022.01); *G06V 10/764* (2022.01); *G06V 10/945* (2022.01); *G06V 10/95* (2022.01)

(58) Field of Classification Search
    CPC .......... G06V 30/1448; G06V 30/40–42; G06T 2207/30176
    See application file for complete search history.

(56) References Cited

U.S. PATENT DOCUMENTS

| | | | | |
|---|---|---|---|---|
| 2021/0133498 A1* | 5/2021 | Zhang | .................... | G06F 18/28 |
| 2021/0174109 A1* | 6/2021 | Beller | .................. | G06V 30/416 |
| 2021/0248303 A1* | 8/2021 | Sirangimoorthy | .... | G06F 40/106 |
| 2022/0398397 A1* | 12/2022 | Gangadhar | ....... | G06F 18/24765 |
| 2023/0109299 A1* | 4/2023 | Crouse | .............. | G06Q 20/3276 |
| | | | | 705/39 |
| 2023/0206364 A1* | 6/2023 | Davis | .................. | G06V 30/413 |
| | | | | 705/311 |
| 2023/0368557 A1* | 11/2023 | Kolavennu | ............. | G06F 18/23 |
| 2024/0062306 A1* | 2/2024 | Gross | .................... | G06Q 40/08 |
| 2024/0212379 A1* | 6/2024 | Kalita | .................... | G06V 10/82 |
| 2025/0078049 A1* | 3/2025 | Fakieh | .............. | G06Q 30/0645 |
| 2025/0182206 A1* | 6/2025 | Patton | ................. | G06Q 20/401 |

\* cited by examiner

*Primary Examiner* — Gregory A Morse
*Assistant Examiner* — Stefano Anthony Dardano
(74) *Attorney, Agent, or Firm* — GableGotwals

(57) ABSTRACT

Embodiments of systems and methods of this disclosure provide a multi-tenant user interface for uploading a variety of different documents over a network to a content server; analyze the uploaded documents on the content server using an AI-powered document analysis engine to identify, for each document, a document type and industry, the AI powered document analysis engine including one or more AI machine learning models trained on documents within the industry and an operator-specific adaptation corresponding to a pre-determined transaction; generate a tailored data extraction prompt based on the document type- and industry using an adaptive prompting system on the content server; extract, from each document by way of the AI-powered document analysis engine, data corresponding to the tailored data extraction prompt; and standardize the extracted data using a data standardization module on the content server.

39 Claims, 6 Drawing Sheets

FIG. 3A

Document Viewer  | OPEN IN NEW TAB |

| 1090 |

| 2 /5 | — | 99% | + | ⬚ ⬆⬇ | ⟳ ✎ | ↺ ⟳ |

Summary

Check Amount: 210.96
Check Number: 124771
Operator Name: BLUEMARK ENERGY LLC
Owner Name: STEPHENSON RESOURCES LLC
Statement Number: 124771
Document Date: 2024-12-03
Owner Number: 209401

Confidence_reasons
- Document is clearly legible with consistent formatting.
- All required fields were successfully extracted.
- Mathematical relationships between gross values, deductions, and net values.
- Two-line deduction format was correctly identified and processed.
- Check amount matches the sum of owner net values.

Owner Code: 209401  Date: 12/03/24
To: XYZ Resources  From: CC Energy

-----New Revenue This Statement-----

| Prod Code | Prod. Month | Unit Price | Decimal Interest | Gross Vol. / Net Vol. | Gross Val. / Net Value | State Taxes Description | Amount | GrsOthDeds / NetOthDeds | BTU Factor | Netted & NetRevenue | Check-Pymt | Balance Owed You |
|---|---|---|---|---|---|---|---|---|---|---|---|---|
| *** Well: 1345901367 STEALTH # 1, Random County, OK API# N/A *** | | | | | | | | | | | | |
| G | 10/24 | $0.35 | 0.0004286000 | 69.00 | $24.49 | OKGP | $1.71 | | | | | |
| GAS | RI | | | 0.03 | $0.01 | (Net) | $0.00 | | | | | |
| | | | | | | OKMW | $0.01 | | | | | |
| | | | | | | (Net) | $0.00 | | | | | |
| | | | | | | OKPE | $0.00 | | | | | |
| | | | | | | (Net) | $0.02 | | | | | |
| | | | | | | OKERF | $0.00 | | | | | |
| | | | | | | (Net) | $0.02 | | | | | |
| | | | | | | OKRANDOM | $0.00 | | | | | |
| | | | | | | (Net) | $1.96 | | | | | |
| | | | | | | OKNRWT | $0.00 | | | | | |
| | | | | | | (Net) | $1.22 | | | | | |
| | | | | | | FBWI | $0.00 | | | | | |
| | | | | | | (Net) | $5.88 | $0.00 | 1.18788 | | $0.00 | $0.00 |
| | | | | | | | $0.00 | $0.00 | $0.01 | | | |
| O | 10/24 | $72.31 | 0.0004286000 | 152.62 | $11,036.02 | OKGP | $785.91 | | | | | |
| OIL | RI | | | 0.07 | $4.73 | (Net) | $0.00 | | | | | |
| | | | | | | OKRANDOM | $0.34 | | | | | |
| | | | | | | (Net) | $882.88 | | | | | |
| | | | | | | OKNRWT | $0.00 | | | | | |
| | | | | | | (Net) | $551.80 | | | | | |
| | | | | | | FBWI | $0.00 | | | | | |
| | | | | | | (Net) | $2,648.64 | $4.39 | | $4.39 | $0.00 | $4.39 |
| | | | | | | | $0.00 | $0.00 | | | $0.00 | |

TO FIG. 3B

Figure 3B:
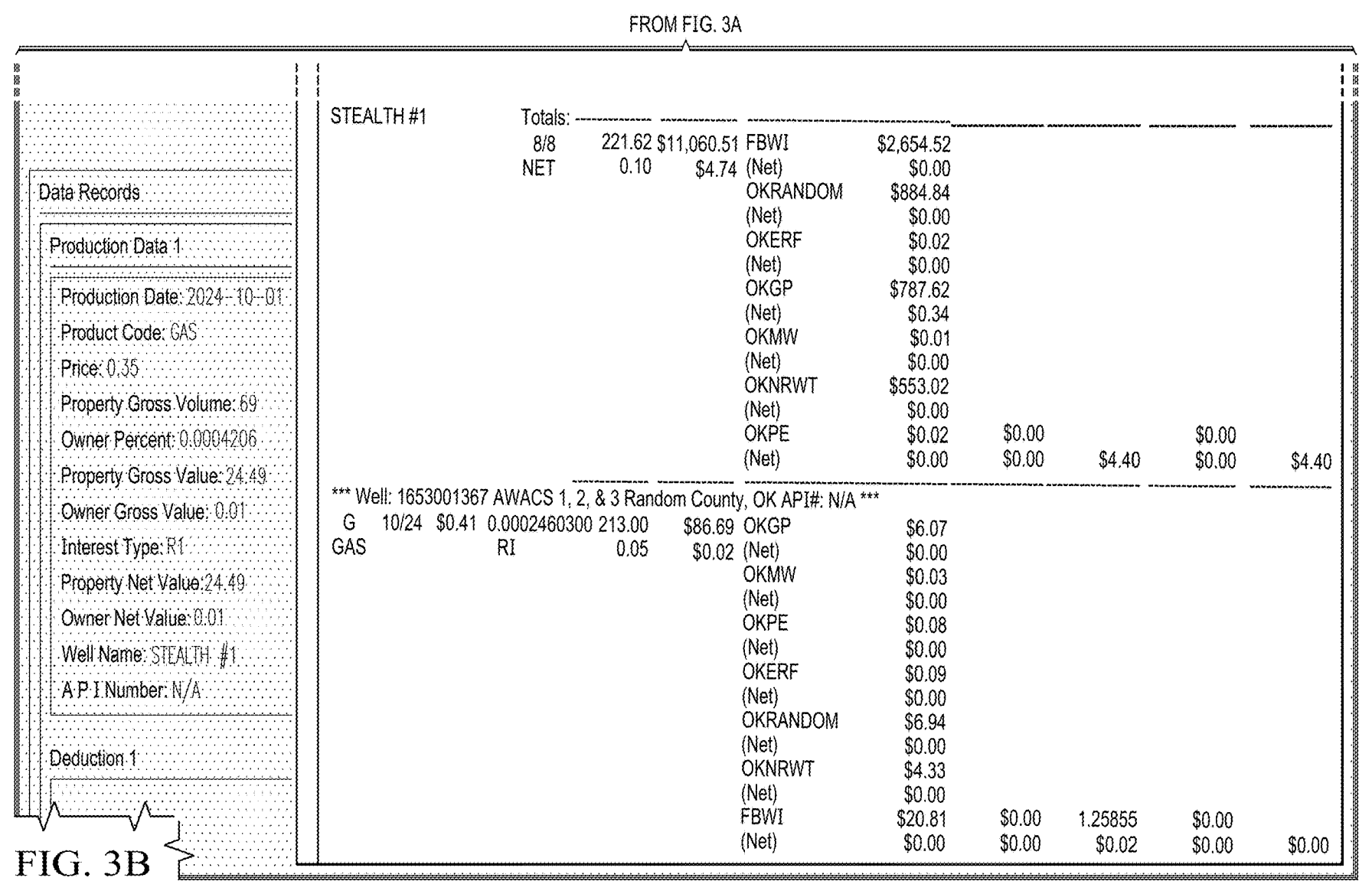

FROM FIG. 3A

STEALTH #1

| | | | | | | | | |
|---|---|---|---|---|---|---|---|---|
| Totals: | | | | | | | | |
| 8/8 | 221.62 | $11,060.51 | FBWI | $2,654.52 | | | | |
| NET | 0.10 | $4.74 | (Net) | $0.00 | | | | |
| | | | OKRANDOM | $884.84 | | | | |
| | | | (Net) | $0.00 | | | | |
| | | | OKERF | $0.02 | | | | |
| | | | (Net) | $0.00 | | | | |
| | | | OKGP | $787.62 | | | | |
| | | | (Net) | $0.34 | | | | |
| | | | OKMW | $0.01 | | | | |
| | | | (Net) | $0.00 | | | | |
| | | | OKNRWT | $553.02 | | | | |
| | | | (Net) | $0.00 | | | | |
| | | | OKPE | $0.00 | $0.00 | $0.00 | | |
| | | | (Net) | $0.02 | $0.00 | $4.40 | $0.00 | $4.40 |

* Well: 1653001367 AWACS 1, 2, & 3 Random County, OK API#: N/A *

| | | | | | | | | | | |
|---|---|---|---|---|---|---|---|---|---|---|
| G | 10/24 | $0.41 | 0.0002460300 | 213.00 | $86.69 | OKGP | $6.07 | | | |
| GAS | | RI | 0.05 | | $0.02 | (Net) | $0.00 | | | |
| | | | | | | OKMW | $0.03 | | | |
| | | | | | | (Net) | $0.00 | | | |
| | | | | | | OKPE | $0.08 | | | |
| | | | | | | (Net) | $0.00 | | | |
| | | | | | | OKERF | $0.09 | | | |
| | | | | | | (Net) | $0.00 | | | |
| | | | | | | OKRANDOM | $6.94 | | | |
| | | | | | | (Net) | $0.00 | | | |
| | | | | | | OKNRWT | $4.33 | | | |
| | | | | | | (Net) | $0.00 | | | |
| | | | | | | FBWI | $20.81 | $0.00 | 1.25855 | $0.00 |
| | | | | | | (Net) | $0.00 | $0.00 | $0.02 | $0.00 |

Data Records

Production Data 1:

Production Date: 2024-10-01
Product Code: GAS
Price: 0.35
Property Gross Volume: 69
Owner Percent: 0.0004206
Property Gross Value: 24.49
Owner Gross Value: 0.01
Interest Type: RI
Property Net Value: 24.49
Owner Net Value: 0.01
Well Name: STEALTH #1
A P I Number: N/A Deduction 1

Document Viewer    OPEN IN NEW TAB 1078    1 / 1    —   95%   +   ⊕ ⟲ | ✎ | ↺ ↻

Figure 4A:
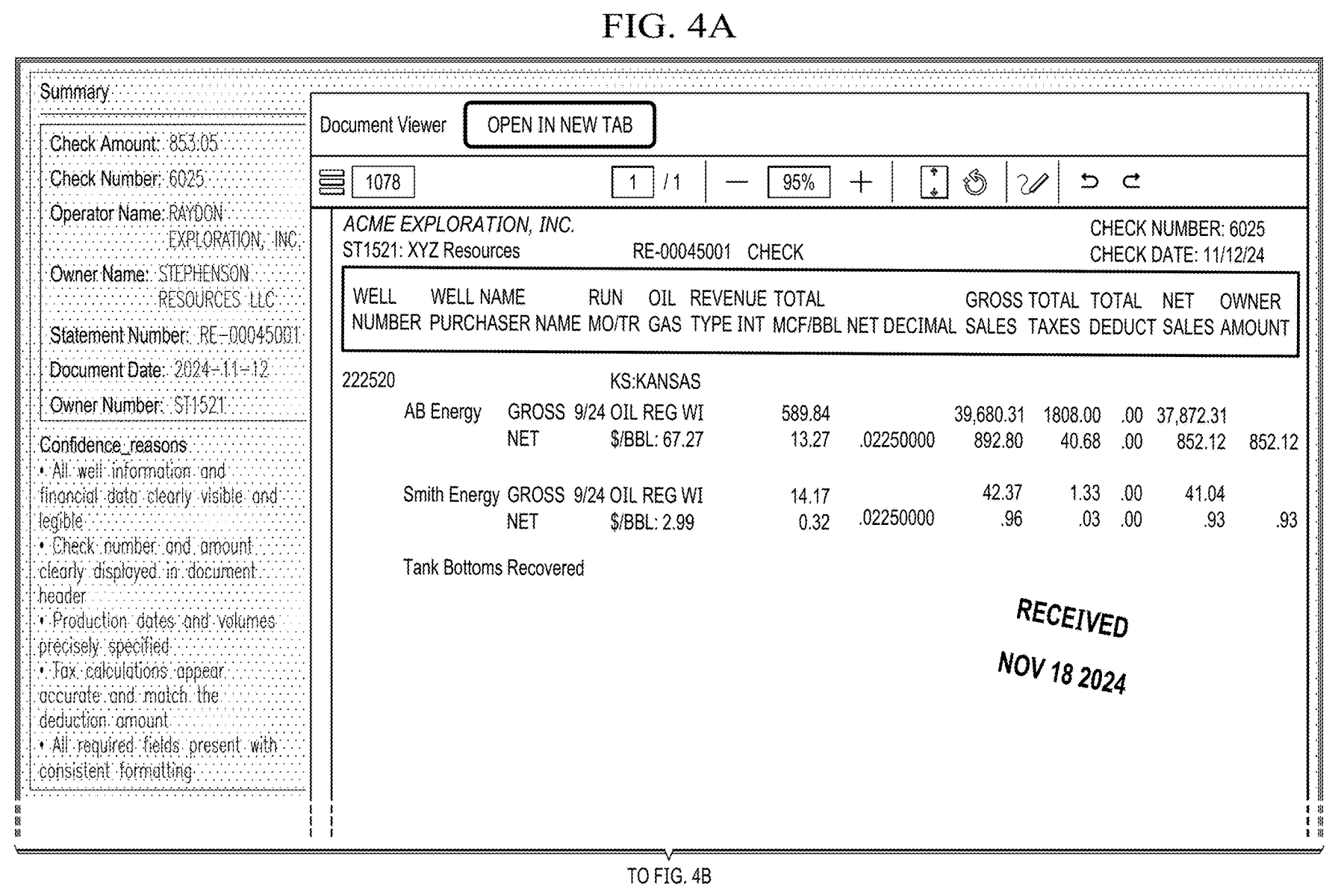

*ACME EXPLORATION, INC.*
ST1521: XYZ Resources     RE-00045001   CHECK

CHECK NUMBER: 6025
CHECK DATE: 11/12/24

| WELL NUMBER | WELL NAME | PURCHASER NAME | RUN MO/TR | OIL GAS | REVENUE TYPE | TOTAL INT | MCF/BBL | NET DECIMAL | GROSS SALES | TOTAL TAXES | TOTAL DEDUCT | NET SALES | OWNER AMOUNT |
|---|---|---|---|---|---|---|---|---|---|---|---|---|---|
| 222520 | KS:KANSAS | | | | | | | | | | | | |
| | AB Energy | GROSS | 9/24 | OIL | REG WI | 589.84 | | | 39,680.31 | 1808.00 | .00 | 37,872.31 | |
| | | NET | | $/BBL: 67.27 | 13.27 | .02250000 | | 892.80 | 40.68 | .00 | 852.12 | 852.12 | |
| | Smith Energy | GROSS | 9/24 | OIL | REG WI | 14.17 | | | 42.37 | 1.33 | .00 | 41.04 | |
| | | NET | | $/BBL: 2.99 | 0.32 | .02250000 | | .96 | .03 | .00 | .93 | .93 | |

Tank Bottoms Recovered

RECEIVED
NOV 18 2024

TO FIG. 4B

Summary

Check Amount: 853.05

Check Number: 6025

Operator Name: RAYDON EXPLORATION, INC.

Owner Name: STEPHENSON RESOURCES LLC

Statement Number: RE-00045001

Document Date: 2024-11-12

Owner Number: ST1521

Confidence_reasons
• All well information and financial data clearly visible and legible
• Check number and amount clearly displayed in document header
• Production dates and volumes precisely specified
• Tax calculations appear accurate and match the deduction amount
• All required fields present with consistent formatting

FROM FIG. 4A

ADAPTIVE PROCESS FOR MULTI-INDUSTRY DOCUMENT ANALYSIS, DATA EXTRACTION, AND BLOCKCHAIN TOKENIZED ASSET TRACKING

CROSS-REFERENCE TO CO-PENDING APPLICATIONS

This application claims priority to, and the benefit of, U.S. 63/683,379 filed 15 Aug. 2024, the content of which is incorporated by reference herein.

FIELD OF THE DISCLOSURE

This disclosure relates to an intelligent document processing system designed for application across various specialized industries such as, but not limited to, oil and gas, private credit, syndicated lending, alternative energy, healthcare, education, legal, logistics, real estate, and construction.

Systems and methods of this disclosure utilize advanced artificial intelligence ("AI") technology to streamline the analysis and data extraction from documents including, but not limited to, deeds, leases, affidavits, death certificates, revenue statements, joint interest billings, credit agreements, and other financial and legal documents. The analysis and data extraction are intended to facilitate or accomplish a pre-determined transaction for which accurate information from the documents is required. Additionally, systems and methods of this disclosure may incorporate blockchain technology and tokenization to provide secure, transparent, and efficient management of assets and transactions across multiple sectors.

BACKGROUND OF THE DISCLOSURE

In many specialized industries (e.g., oil and gas, private credit, and syndicated lending), the processing and analysis of complex legal and financial documents are critical yet time-consuming tasks. The documents often come from disparate sources, employ different formats and data fields, and are of varying information accuracy, completeness, and presentation quality. Traditional methods of document analysis are often prone to errors, inconsistencies, and inefficiencies. Furthermore, many industries face challenges in verifying asset ownership, managing fractional interests, and facilitating secure transactions.

Embodiments of this disclosure address these challenges by providing an adaptive AI-driven system capable of accurately processing, categorizing, and extracting key information from industry-specific documents, while also leveraging blockchain technology to ensure secure and transparent record-keeping and transactions. The adaptable AI system includes a two-stage prompt, thereby making embodiments of this disclosure a specialized computer as well as improving functioning of the computer. The system and method makes use of the two-stage prompt to process disparate documents containing certain required data stored in non-standardized data fields and formats and in different locations within the documents, extract the data from the documents, and generate a database containing standardized data fields and data.

SUMMARY

Embodiments of a system and method of this disclosure comprise an intelligent document processing system that combines advanced AI technologies, blockchain integration, tokenization, and industry-specific knowledge with user-friendly interfaces for document handling and asset/property rights management in specialized sectors. Key features of the system and method include all, or some combination of:

- AI-powered document analysis and data extraction;
- Industry-specific document categorization and processing;
- Adaptive learning capabilities for continuous improvement;
- User-friendly interface for document upload, review, and correction;
- Robust error handling and quality assurance measures;
- Asset ownership assurance for verifying and validating property ownership;
- Blockchain integration for secure, immutable record-keeping;
- Tokenization system for representing and managing fractional ownership of assets;
- Marketplace platform for buying, selling, and leasing assets using verified information and tokenized assets.

In some embodiments of this disclosure, an integrated process for intelligent document processing, blockchain-based asset management, and tokenization across multiple industries, comprises: a) providing a user interface for uploading and managing documents; b) analyzing documents using an AI-powered document analysis engine capable of processing various document formats; c) generating tailored data extraction prompts based on document type and industry using an adaptive prompting system; d) standardizing output across various input formats using a data standardization module; e) implementing error handling and quality assurance with confidence level reporting; f) improving system accuracy over time through a continuous learning algorithm; g) integrating with industry-specific software and databases; and h) customizing document processing for industry-specific document types and company nomenclature.

In other embodiments of this disclosure, a process for providing title verification and assurance for assets comprises: b, c) ingesting and processing large volumes of asset-related documents; d) extracting key information from documents using AI-powered analysis and industry-specific prompts; i) constructing an ownership chain using an algorithm; j) generating an "asset ownership assurance" product based on the constructed ownership chain and associated risk assessment.

In yet other embodiments of this disclosure, a process for managing ownership of assets using blockchain technology comprises: r) implementing a permissioned blockchain network; s) executing smart-contracts for managing ownership records, facilitating transfers, and maintaining an immutable audit trail; t) integrating with a document processing system for automated record creation and real-time updates; and u) facilitating a marketplace for buying, selling, and leasing assets, leveraging blockchain's security and privacy features.

In still other embodiments of this disclosure, a process for tokenizing fractional ownership of assets across various industries, comprises: k) creating digital tokens representing fractional ownership of assets; k') managing the issuance, transfer, and redemption of these tokens; k") integrating the tokenization process with the blockchain-based asset management system; l) providing a user interface for token holders to view and manage their tokenized asset ownership.

The system's ability to generate document-specific extraction prompts enables it to handle the high variability in document formats found in specialized industries while maintaining consistent output formats. Embodiments include the use of a novel, structured, hierarchical prompting methodology that effectively turns general-purpose AI into a specialized document processing system without the computational and data requirements of traditional custom model development.

Embodiments of the system and process comprise non-transitory, computer-readable medium containing instructions thereon, the instructions when acted on by a processor perform steps of: a) providing a user interface for uploading documents over a network to a content server, at least one of the documents uploaded by a user being a different document type or having at least one different document structure, one different data field, one different data type, or one different data format than at least one other document uploaded by another user; b) analyzing the uploaded documents on the content server using an AI-powered document analysis engine to identify, for each document, a document type and industry; c) generating a tailored data extraction prompt based on the document type and industry using an adaptive prompting system; d) extracting, from each document, data corresponding to the tailored data extraction prompts; e) standardizing the extracted data using a data standardization module; (f) storing the standardized extracted data in a database; and (g) providing access, through the user interface, to the stored standardized extracted data. The database may comprise a blockchain. The AI-powered document analysis engine includes one or more AI adaptive learning models and an operator-specific adaptation corresponding to a pre-determined transaction. By way of a non-limiting example, the pre-determined transaction may be determining mineral rights associated with oil and gas leases. The models are not required to be trained on a sample set of documents prior to their use.

In embodiments, one or more of the documents comprise asset data including at least one asset or property and asset ownership. The instructions may further perform steps of (h) selecting, through the user interface, at least one asset stored in the database; (i) constructing an ownership chain of the at least one asset, the ownership chain including a risk assessment; and (j) generating an ownership report based on the constructed ownership chain and the risk assessment.

In some embodiments of the system and method, the instructions perform steps of k) creating digital tokens representing fractional ownership of the at least one asset and l) providing a user interface for token holders to view and manage a corresponding tokenized asset ownership.

In embodiments, the extracting of the data is independent of predetermined document layouts and predetermined data locations. The tailored data extraction prompt may include instructions for identifying and extracting information based on two or more predetermined document types. The extracting may further include m) identifying missing data elements that are expected but not found in the document and n) flagging the missing data elements for a user's attention.

Embodiments of this disclosure may further comprise o) generating, by the content server, a cryptographic hash of the standardized extracted data; p) recording the cryptographic hash linked to the standardized extracted data on a blockchain ledger to create a tamper-evident audit trail; and q) enabling retrieval and verification of the standardized extracted data using the blockchain ledger.

Embodiments of a method of this disclosure for generating a database from a series of electronically stored documents include acquiring a plurality of electronically stored documents, the plurality including two or more of: a native text document, a scanned document, and an image. For each of the plurality of electronically stored documents, prompting an AI to classify the document type, determine at least one expected data field, and generate a second-stage prompt, the second-stage prompt containing extraction instructions, industry-specific terminology, and database formatting requirements. For each of the plurality of electronically stored documents, using the second-stage prompt to prompt an AI to extract information from the plurality of documents, the AI generating database fields based on formatting requirements and content from the plurality of electronically stored documents and populating the database fields with the extracted information.

The plurality of electronically stored documents may comprise asset data, including at least one asset and asset ownership. The method may further include selecting, through a user interface, at least one asset stored in the database; constructing an ownership chain of the at least one asset; and generating an ownership report based on the constructed ownership chain. The ownership chain may include at least one risk assessment. The method may also create digital tokens representing fractional ownership of the at least one asset.

Embodiments of a computer system of this disclosure for generating an electronic ownership chain include at least one content server, including a non-transitory, computer-readable medium containing instructions thereon; an AI document analysis engine, the engine having a first prompting stage and a second prompting stage, the first prompting stage being configured to classify document types and industry to determine at least one expected data field; the second prompting stage being configured to accept a prompt from the first prompting stage and to extract information from at least one electronically stored document, the extracted information corresponding to the at least one expected data field, wherein the information from the at least one electronically stored document comprises asset data including at least one asset and asset ownership; a blockchain database configured to create digital tokens representing fractional ownership of the at least one asset; and a user interface for a token holder to view and manage a portion of the digital tokens.

Embodiments of this disclosure include a multi-stage AI analysis engine with operator-specific prompt generation and contextual validation, dynamic operator-specific (producer-sourced) processing with historical pattern recognition and adaptive field mapping, and a multi-layer validation framework with financial reconciliation, confidence scoring, and anomaly detection The system and method for adaptive multi-industry document processing include a) providing a multi-tenant user interface; b) analyzing documents using an AI-powered engine with operator-specific adaptation (producer-sourced documentation); and c) generating tailored extraction prompts based on document producer identity. The multi-tenant user interface can include company-based data isolation with role-based access control. The analyzing documents can include processing multi-row document structures with different header labels for related data entries. The operator-specific adaptation can include dynamic prompt generation based on document producer identification, historical pattern recognition for producer-specific document structures, and adaptive field mapping engines that learn source variations.

BRIEF DESCRIPTION OF THE DRAWINGS

FIG. 3A is an example screen shot of a document processed a system and method of this disclosure, showing summary information, confidence reasons, and data records including production data. Some or all of a portion of the document or its content may be skewed or blurred (or both) and could be black-and-white, gray scale, or colored (see e.g., FIGS. 4A & 4B). Any company or personal identifying information has been edited or redacted from the screen shot to maintain privacy and preserve anonymity.

FIG. 3B is a continuation of the screen shot of FIG. 3A.

FIG. 4A is another example screen shot of another document that is of a different type and layout, including different data fields, than the document of FIGS. 3A & B and processed by a system and method of this disclosure. Similar to FIGS. 3A & B, any company or personal identifying information has been edited redacted from the screen shot to maintain privacy and preserve anonymity.

DEFINITIONS

Figure 1:
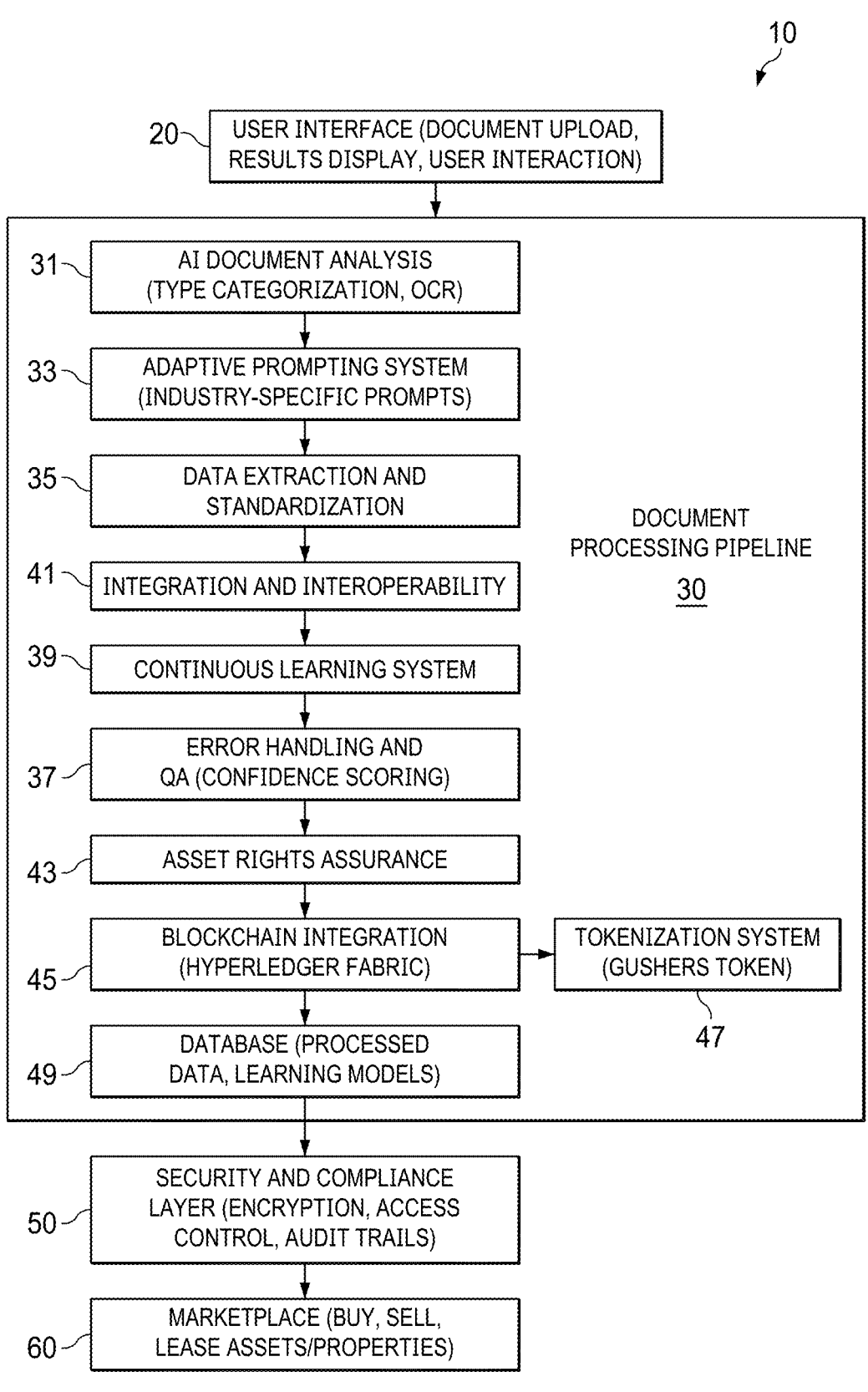
FIG. 1 is a schematic of a system architecture of a document processing system and method of this disclosure.

For the purposes of this disclosure, the following definitions of terms apply. The examples, where given for a term, are intended to be explanatory or illustrative and not limiting.

Transaction: a pre-determined purpose for processing documents to extract relevant data from the documents, the relevant data being that needed to accomplish the purpose (e.g., ownership chain construction for oil and gas mineral rights).

Document type or category: the form of a document that distinguishes it from other forms and helps identify what the document is (e.g., deed, lease, payment advice, joint interest billing, credit agreement).

Document format: the way information or data in the document is saved and encrypted (e.g., text, image). Two documents of the same document type, each containing relevant data for a transaction, may have different document formats.

Document structure: the location of data fields within the document. Two documents of the same type or format (or both), each containing relevant data for a transaction, may have different document structures.

Data type: the form of information or data within a data field (e.g., text, numeric, financial, date, image).

Data format: the way a piece of information or data in a data field is saved and encrypted.

Data field: a piece of information located in a document that can be identified by a logical name or label (e.g., property id, property name, production date, product code, price, property gross volume, owner percent, property gross value). The name or label found in the document may not be a correct or accurate data field name or label given the piece of information.

Non-standardized data field: a data field that differs in name or label, or in content, or some combination thereof, from the standardized data field but contains at least a portion of the information or data corresponding to that of a standardized data field.

Standardized data field: a predetermined data field, including its name or label, and its content, which encompasses one or more non-standardized data fields and includes information or data common to those non-standardized data fields. For example, a standardized data field can be "ownership interest %", the non-standardized data fields being "decimal interest" or "disbursement decimal".

New data field: a subset of the information or data located in a data field and assigned a different logical name or label than that of the data field. The new data field is not one found in the document but is derived from one or more of the document's data fields. The new data field(s) may be obtained from parsing and splitting a longer data string found in the document. Or, the new data field may be obtained by combining two or more data fields into one. The new data field can be a standardized data field.

Expected data field: a piece of information or data a document should contain based upon the document type and industry context.

Expected data: the information or data that an expected data field should contain.

Non-standardized data: Information or data contained in a data field that varies in naming or labeling conventions, data formats, or data types (or some combination thereof) across different document producers—e.g., "Disbursement Interest," "Decimal Interest," "Owner Share," or "Distribution Interest"—all representing the same information or data but using different field names or labels, formats, or presentation styles depending on the document source.

Standardized Data: Information or data that has been extracted from source documents and converted to comply with predetermined data field names or labels, data types, and data formats regardless of the original document's data field's naming conventions, types, or formatting variations. For example, data from fields labeled "Disbursement Interest," "Decimal Interest," or "Owner Share" can be standardized to a consistent field name such as "Owner Int Pct" with uniform decimal formatting and data type.

Metadata: information about the document and its content.

Multi-tenant Architecture: A software architecture where a single instance of the system serves multiple tenants (e.g., companies or organizations) with complete data isolation, where each tenant's data and operations are kept separate and secure from other tenants' data and operations.

Two-stage prompting (or Multi-stage prompting): A hierarchical AI prompting methodology where an initial meta-prompt generates a document-specific extraction prompt, which then directs the AI to extract and standardize data from the document, enabling general-purpose AI to function as a specialized document processing system.

Adaptive field mapping: An AI system capability that learns and adjusts data field identification and extraction rules based on variations in document structure and content from different producers, without requiring manual reconfiguration.

Handwritten Data: Text, numbers, signatures, annotations, or other markings manually written on a document by hand, which the AI system can detect, locate, transcribe, and contextually interpret without requiring separate optical character recognition ("OCR") preprocessing, including both printed handwriting and cursive script that may appear in margins, form fields, or as document annotations.

Operator-specific adaptation: Dynamic customization of the AI document processing system based on the identity and historical document patterns of a document producer (such as an oil and gas operator, law firm, or financial institution), including dynamic prompt generation tailored to that producer's document formats, historical pattern recognition for producer-specific document structures, and adaptive field mapping that learns and adjusts to variations in how specific producers present similar information across their documents.

Confidence Score: A numerical assessment (typically 0-100%) generated by the AI system indicating the reliability and accuracy of extracted data based on multiple factors including optical clarity of source content, contextual consistency with expected document structure, mathematical validation against related fields, historical accuracy patterns for the document producer, and completeness of expected data fields. The confidence score enables automated quality assurance, risk assessment, and threshold-based decision making for downstream applications.

Document producer: an original creator or original source of a document. The document producer is not necessarily the same person, entity, or tenant as the user who uploads the document into a system of this disclosure.

DETAILED DESCRIPTION

Figure 4B:
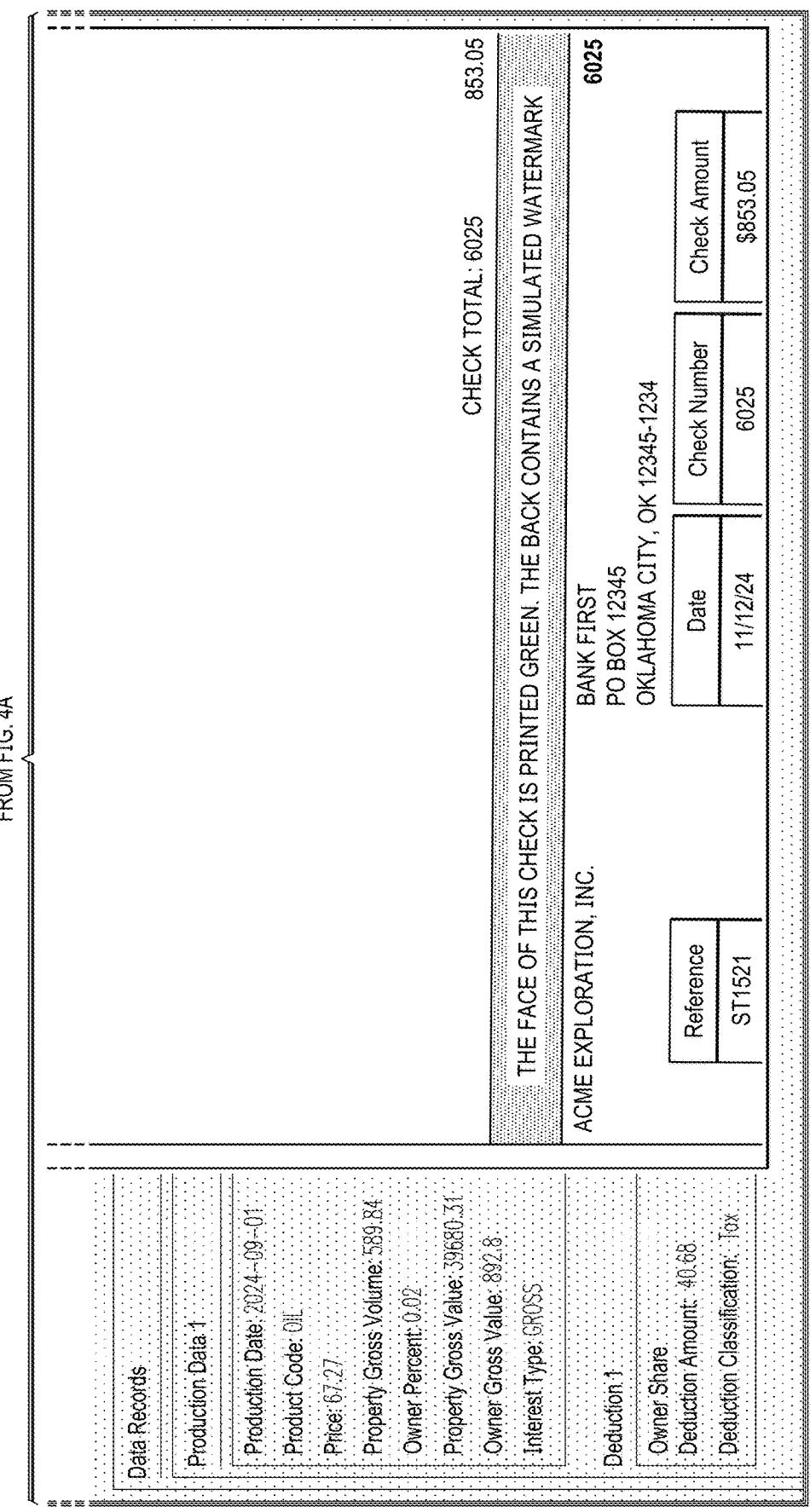
FIG. 4B is a continuation of the screen shot of FIG. 3B.

Referring first to FIG. 1, embodiments of a system 10 of this disclosure comprise a user interface 20 through which users can upload documents, display results, and interact with the system 10; a document processing pipeline 30 including an AI document analysis engine 31 and an adaptive prompting system 33; a security and compliance layer 50 including encryption, access control, and audit trails, and a marketplace 60 in which assets may be bought, sold, or leased. The document analysis engine 31, through the prompting system 33, extracts and then standardizes 35 data from a plurality of documents of varying quality, accuracy, type, format, and structure that contain information required for a pre-determined transaction. See e.g., FIGS. 3 and 4.

The document processing pipeline 30 further provides integration and interoperability 41. In embodiments, integration is achieved by one or more of the following: enterprise software Application Programming Interfaces ("APIs") providing direct connections to, for example, accounting systems (e.g., Quorum, Intertia, SAP, Oracle), land management software, and regulatory databases; native support for industry standards such as oil & gas formats (e.g., Check Stub Data Exchange or CDEX), healthcare standards (e.g., health level seven ("HL7"), Fast Healthcare Interoperability Resources ("FHIR")), and financial protocols; multi-format I/O including bidirectional data exchange in JavaScript Object Notation ("JSON"), Extensible Markup Language ("XML"), Comma-Separated Values ("CSV"), Microsoft Excel Spreadsheet ("XLS"), and proprietary formats; and real-time synchronization including updates between data processed by systems and methods of this disclosure and connected business systems.

Interoperability is achieved by way of one or more of the following: cross-platform compatibility with cloud, on-premise, and hybrid enterprise architectures; blockchain network integration including connection to external blockchain networks and regulated exchanges; workflow automation including triggering or initiating actions in connected systems based on document processing results; and data standardization bridge(s) that converts the standardized extracted data or standardized output of systems and methods of this disclosure to match one or more corresponding connected system's expected input format.

Embodiments of this disclosure, therefore, help solve what is called the "data island" problem where document processing results sit isolated from other results. Extracted data of this disclosure immediately flows into existing business workflows where the system updates accounting records, triggers compliance reports, and initiates blockchain transactions without manual intervention. The system further maintains mapping tables for each connected platform, automatically formatting and routing data based on destination system requirements while verifying data integrity and creating audit trails.

The document processing pipeline 30 further includes a continuous learning system 39 that refines the document analysis, extraction, and standardization. Rather than rely upon AI learning models previously trained on industry documents, embodiments of this disclosure make use of AI-enabled adaptive learning and feedback. The pipeline 30 also includes error handling and quality assurance 37, providing a confidence score and asset rights assurance 43. Some embodiments include blockchain integration 45 along with a tokenization system 47. The system 10 further comprises a database 49 containing the processed data as well as learning models used by the engine 31 and its adaptive prompting system 33.

Figure 2:
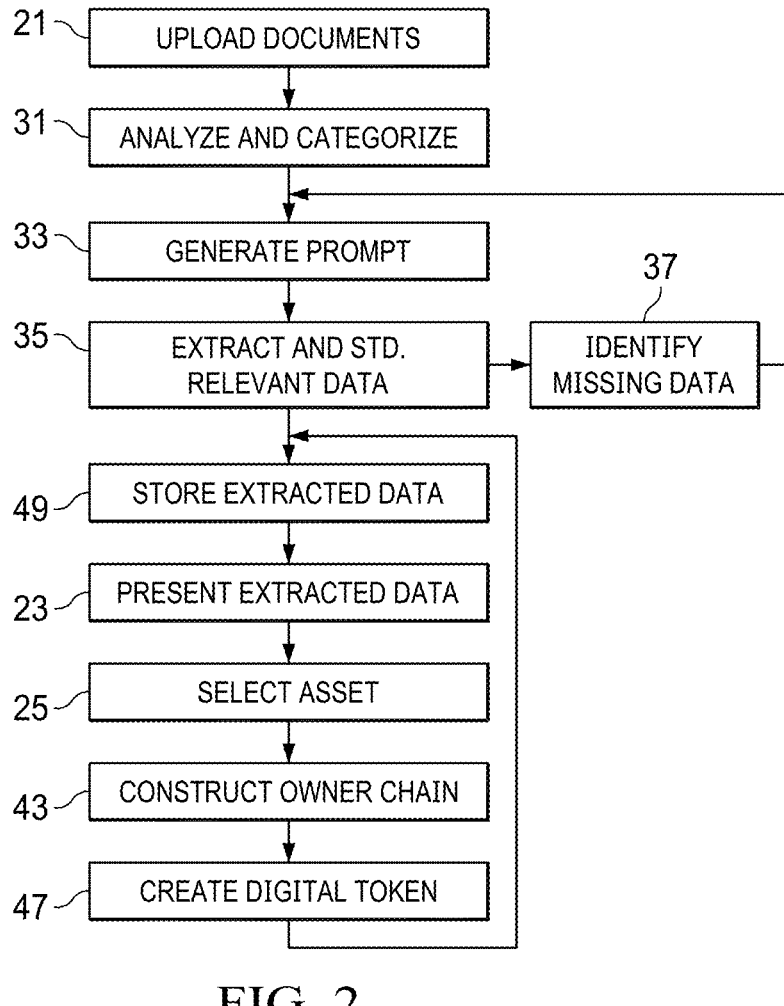
FIG. 2 is a flow diagram of embodiments of the system and method of FIG. 1.

Referring now to FIG. 2, in methods of this disclosure, one or more users upload documents 21 for analysis and categorization 31 by the document analysis engine. The adaptive prompting system then generates one or more prompts 33 so that data of interest can be extracted and standardized 35. Missing or incorrect data (or both) is identified 37 by the engine's error handling module. The extracted, standardized data is then stored 49 in a database and can be presented 23 to a user (through interface 20; see FIG. 1). The user can then select 25 an asset and, as part of an asset rights assurance module, an ownership chain 43 is constructed. In some embodiments, a digital token 47 is created.

Embodiments of this disclosure are well adapted for use in any application in which document producers provide, from various and disparate sources, multiple documents in various and disparate document formats, completeness, and quality, and from which relevant data or information needed to achieve a specific purpose must be identified, extracted, standardized, and presented to achieve the purpose. Toward this end, embodiments of this disclosure comprise a multistage AI analysis engine with operator-specific prompt generation and contextual validation, dynamic operator-specific (producer-sourced) processing with historical pattern recognition and adaptive field mapping, and a multi-layer validation framework with financial reconciliation, confidence scoring, and anomaly detection.

Embodiments of an intelligent document processing system of this disclosure are designed to handle a wide range of document types from industries including, but not limited to, oil and gas, private credit, syndicated lending, alternative energy, healthcare, education, legal, logistics, real estate, and construction. Although specific examples are provided herein for oil and gas, private credit, and syndicated lending, embodiments of this disclosure are not limited to these example applications.

In systems and methods of this disclosure, users upload documents in various document formats-including PDFs, scanned PDFs, and images-through a web-based interface and the system accepts the various document formats. The system then analyzes and categorizes the documents using one or more AI algorithms, extracts the relevant data based on document type and industry-specific rules, and standardizes the extracted data. The extracted, standardized data is presented to users for review and potential correction. The system continuously learns from user interactions and feedback to improve accuracy over time.

Unlike traditional document processing systems, embodiments of this disclosure leverage the advanced capabilities of AI systems to handle both text and image-based documents directly. The system sends the uploaded documents (e.g., PDFs, scanned PDFs, or images) directly to the AI system via API, without requiring any intermediate OCR) processing. The AI system is responsible for extracting readable text from all document types, including image-based documents and scanned PDFs. This approach takes advantage of the AI's advanced image processing and text recognition capabilities. By relying on the AI for text extraction, the system can process a mix of native text documents, scanned documents, and images without requiring separate workflows or pre-processing steps.

Traditional systems often rely on fixed templates or predefined zones within documents to extract data. These systems assume that specific data elements will always appear in the same location across different documents. In contrast, embodiments of this disclosure do not depend on fixed document layouts or predetermined data locations. Instead, the system utilizes context-aware AI to understand the document's content and structure and adapt to varying document formats, even within the same document type or document producer.

In embodiments, data identification is based on understanding what data should be present in a specific document type, rather than where it should be located within the document. An initial prompt identifies the document type and operator or producer, providing context for subsequent analysis. Based on this context, the system knows what key-value pairs to search for throughout the entire document. Therefore, the AI can identify relevant data regardless of its position or format within the document.

The system can identify and then extract specific elements and key-value pairs expected in a particular document type. The system is aware of data elements typically provided by specific producers of a document, such as an oil and gas operator, allowing for operator-specific extraction rules, or a law firm that creates credit agreements and has law-firm-specific language. The system also can identify missing data elements that are expected but not found in the document, flagging these for a user's attention.

The system's approach allows for continuous improvement in data extraction accuracy. As it processes more documents, it learns variations in how different document producers (such as oil and gas operators) present similar information. The system can adapt to changes in document formats over time without requiring manual reconfiguration. User feedback and corrections are incorporated to refine the extraction process for future documents.

Embodiments of this disclosure are particularly valuable in industries where: document formats can vary significantly between different producers or over time; the same type of information might be presented in different ways or locations within a document; and new types of data or document structures may be introduced, requiring system flexibility.

The AI system performs an initial analysis on the processed document, thereby serving two primary purposes: document type categorization and metadata extraction. In document type categorization, the AI categorizes the document into predefined types including, but not limited to, types used in the oil and gas industry (e.g., deed, lease, payment advice, joint interest billing), or documents used in the private credit markets or syndicated lending (e.g., credit agreements). In metadata extraction, the AI identifies and extracts key metadata including, but not limited to, a general summary, the document producer, ultimate owner, production/execution date, and document number.

By employing this context-aware, intelligent approach to data extraction, embodiments of this disclosure offer a level of flexibility, accuracy, and comprehensiveness that traditional, template-based systems cannot match. This is particularly important in complex industries like oil and gas, private credit, and syndicated lending, where document structures can be highly variable and where missing or incorrectly processed data can have significant financial implications.

In embodiments, the system employs a two-stage prompting mechanism or architecture designed to handle a wide range of document types, with a current focus on specific industries and document categories. This approach allows for precise and efficient document analysis while maintaining the flexibility to expand to other document types in the future. The initial prompt is dynamically formulated to describe key aspects of documents relevant to specific industries and financial sectors. The follow up prompt is then context-specific. The prompt-based approach may make use of large language models ("LLMs")

In the first stage, the initial prompt is a meta prompt that generates a document-specific extraction prompt. In the second stage, the follow up prompt is context-aware. This two-stage approach creates a dynamic, self-adapting system that can handle diverse document types without requiring custom models for each type.

In embodiments, the first-stage meta-prompt contains structured instructions that guide the AI to identify the document type and operator/producer; determine the expected data fields based on document classification; and generate the second-stage prompt optimized for that specific document type. The second-stage prompt, generated by the first stage meta-prompt, contains document-specific and operator- or producer-specific extraction instructions; industry-specific terminology and expected key-value pairs; and formatting requirements for standardized output.

The initial prompt may be composed of several key elements, including document type indicators, industry-specific terminology, data point locators, and contextual understanding prompts. The document type indicators include descriptions of visual and textual cues that help identify the document category (e.g., specific headers, layouts, or key phrases). Industry-specific terminology includes a lexicon of terms and phrases commonly found in documents for each focus industry. Data point locators include instructions for identifying and extracting key information based on typical document structures in each industry. Contextual understanding prompts include elements that guide the AI in understanding the broader context and purpose of the document within its industry.

For example, in oil and gas industry applications such as mineral rights, the prompt incorporates descriptions of legal and financial documents specific to mineral rights, such as leases, deeds, royalty statements, and joint operating agreements. The prompt further includes industry-specific terminology and common document structures found in oil and gas transactions.

In private credit applications such as private lending, the prompt is tailored to analyze documents related to private lending transactions, including loan agreements, promissory notes, and security agreements. The prompt further encompasses characteristics of documents used in direct lending, mezzanine financing, and other forms of private credit.

By way of another example, in syndicated lending such as leveraged loans, par and distressed, the prompt is designed to handle complex documents associated with syndicated loans, including credit agreements, amendments, and intercreditor agreements. The prompt incorporates elements to identify and analyze both par and distressed loan documentation.

In embodiments, the two-stage prompting mechanism is designed to be inherently adaptable to other industries and applications by comprising a modular design or structure that allows for easy addition of new industry-specific modules without altering the core functionality; learning capability such that the system can refine and expand its prompting based on new document types encountered and user feedback; and the underlying two-stage prompting architecture is capable of analyzing any document type, thereby providing a foundation for future expansion into other industries or document categories.

For each industry, the system's prompt is tailored to extract relevant data points. Appendix A provides examples of the data points for mineral rights lease and Appendix B provides examples of the data points for syndicated lending. The system's ability to generate document-specific extraction prompts enables it to handle the high variability in document formats found in specialized industries while maintaining consistent output formats.

In embodiments, the prompting mechanism employs machine learning techniques including pattern recognition, keyword and phrase mapping, context aware analysis, anomaly detection, and feedback integration to continuously improve its document analysis capabilities. As the system processes more documents, it learns to recognize common patterns in document structure and language specific to each industry. The system builds and refines a database of industry-specific keywords and phrases, mapping them to relevant data points and clauses. The system also develops the ability to understand the context of certain clauses or terms, improving accuracy in data extraction. By establishing baselines for typical document contents, the system can flag unusual or potentially erroneous entries for human review. The system incorporates user feedback to refine its extraction algorithms and prompt structures.

As previously described, rather than using traditional fixed templates or zones, the system makes use of dynamic field identification. The system instructs the AI to understand what data should be present based on document type; locate this information regardless of position within the document; and adapt to varying document formats from different operators or producers.

In embodiments, the system also employs sophisticated data extraction and standardization techniques, adaptable to various industry-specific documents. By way of a non-limiting example using mineral rights payment advice documents-while noting that the system can be configured for many other document types across different industries-in embodiments, and by way of a non-limiting example, the system is designed to identify and extract key data points from mineral rights payment advice documents:

1. [Property ID]—Property ID (Document may say property or property #)
2. [Property Name]—Property Name (this is the long name of the Property ID found, it may have numbers and digits after it as well)
3. [County]—County (this will be the county of the property)
4. [State]—(this is the 2 state initials like OK or NY or NJ)
5. [Production Date]—Prd Date (this will be a date field shown as MM/YY or MM-YY which should be transposed to YYYY-MM-DD)

6. [Product Code]—Prod (will be found as either GAS, OIL, NLG, LIQUID, PPROD, or other)
7. [Price]—Price Per (found in a field that labelled price or $/MCF, BBL or gallons)
8. [Property Gross Volume]—(found in a field that shows the gross volume of the property)
9. [Owner Percent]—(this is a decimal that represents the owner's share (Your share) as a percentage. Labelled as decimal interest or owner share or distribution interest or similar)
10. [Property Gross Value]—(this column shows the volume x price in the data to arrive at the value)
11. [Owner Gross Value]—Your Share column (this will hold the value that is due to the owner, the value x the decimal interest or owner percent)
12. [Int Type]—(this field labelled W for Working Interest or RI for Royalty Interest, or O for Overriding Interest, etc.)
13. [Deduction Code]—(Within the grouping for a property ID often found will be negative numbers that represent an expense which is called a deduction. Add the name of the deduction to the end of the column name to identify the type of deduction. For example [Deduction Code and the deduction name]. In this column you will put the amount found for the deduction.)
14. [Owner Share Deduction Code]—Your Share (Each time you find a new deduction in the row you will make 2 new columns as above. [Deductions Code]+the deductions name [Owner Share Deduction Code]+the deduction name that will relate to the new deduction item found. There could be multiple deductions in the data.
15. [Property Net Value]—(Each [Property ID] grouping will end with Net Income; and amount found in a column labelled Property Amt (or similar from our database of meta data). Ensure the net income number is in this key-value pair)
16. [Owner Net Value]—(Each [Property ID] grouping will end with Net Income; and found in the Your Share column. Ensure the Your Share net income number is in this key-value pair)
17. [Section Township Range]—(information labelled about a Sec-Twn-Ri indicating section township range. Possible formation may look like nnnnn: texttext 1H (numbers: text and then initials for range). This is to be split into three columns [Section] [Township] [Range].

The system's flexible architecture allows for similar detailed extraction of key data points from other document types, such as credit agreements, financial statements, or regulatory filings, with each industry and document type having its own set of relevant data points and extraction rules.

In embodiments, the system uses natural language processing, aliases, and pattern recognition to identify these fields, even when they appear under varying labels, for example:

Property ID may be labeled as "property" or "property #" or other as defined by metadata.

Production Date might appear as "Prd Date" or other as defined by metadata.

Product Code could be listed as "Prod" or "Prod Cde" or other as defined by metadata.

Price might be shown as "Price Per" or "$/MCF" or other as defined by metadata.

Owner Percent could be labeled as "decimal interest", "owner share", or "distribution interest" or other as defined by metadata.

The system then standardizes extracted data to ensure consistency across different document formats, for example:

1. Date Standardization: Converts various date formats (e.g., MM/YY or MM-YY) to a standard MMM-YYYY format and full dates to YYYY-MM-DD 2. State Abbreviation: Ensures state names are in standard two-letter abbreviation format (e.g., OK, NY, NJ).

3. Interest Type Coding: Converts interest type descriptions to standard codes (e.g., "W" for Working Interest, "RI" for Royalty Interest).

In embodiments, output standardization is achieved through explicit instructions in the prompt that specify required output format (typically but not limited to JSON structure); data type conversions (e.g., date format standardization); and normalization of terminology across different document operators and producers.

The system also dynamically generates new fields based on the document content, for example:

Deduction Handling: For each deduction found, the system creates two new fields:

[Deduction Code]+deduction name

[Owner Share Deduction Code]+deduction name

The system can handle multiple deductions, creating new fields as needed for each one encountered.

The system can parse and split complex data strings, for example:

Section Township Range Parsing: When encountering data in formats like "nnnnn: texttext 1H", the system intelligently splits this into separate [Section], [Township], and [Range] fields.

The system uses contextual clues to accurately categorize data, for example:

Net Income Identification: Recognizes that the "Net Income" amount should be placed in the [Property Net Value] and [Owner Net Value] fields, depending on whether it's in the "Property Amt" or "Your Share" column.

In embodiments, the system employs a novel algorithm for continuous improvement of its data extraction and categorization capabilities. This algorithm response archiving, periodic analysis trigger, data pre-processing, pattern recognition analysis, missed data identification, categorization accuracy assessment, statistical analysis, machine learning module update, prompt refinement, human-in-the-loop verification, and performance metrics tracking.

In response archiving, all responses received from the AI via the API are systematically stored in a dedicated archive. This archive serves as a comprehensive repository of historical AI interactions and outputs.

In periodic analysis trigger, the system initiates a periodic analysis of the archived responses. This can be triggered based on various factors such as a set time interval (e.g., daily, weekly); reaching a certain threshold of new responses; a user-initiated analysis requests; or some combination thereof.

In data preprocessing, the archived responses undergo preprocessing to normalize data format, remove any personally identifiable information, and tag responses with metadata (e.g., document type, industry, date of processing).

In pattern recognition analysis, the system employs advanced pattern recognition algorithms to identify frequently occurring key-value pairs, variations in key naming convention, and correlations between different key-value pairs.

In missed data identification, the algorithm specifically focuses on identifying potential key-value pairs that are consistently present in the raw document but not extracted, extracted inconsistently across similar document types, and present in some AI responses but missing in others for similar documents.

In categorization accuracy assessment, the system evaluates the accuracy of current categorization by comparing categorizations across similar document, identifying instances of the same data being categorized differently, and assessing the consistency of categorization with predefined industry-specific taxonomies.

In statistical analysis, the system performs statistical analysis on the extracted data to identify outliers that may indicate mis-categorization or extraction errors, trends in data extraction accuracy over time, and correlations between document characteristics and extraction accuracy.

In machine learning model update, based on the analysis results, the system updates its machine learning models to refine key-value pair recognition patterns, improve categorization accuracy, and enhance the system's ability to handle document variations.

In prompt refinement, the results of the analysis are used to refine the prompts sent to the AI including new key-value pairs to look for, adjusting the language used to describe certain data points, and incorporating new context clues for improved data recognition.

In human-in-the-loop verification, for significant changes or in cases of low confidence, the system flags potential improvements for human review and expert users can verify and approve changes before they are implemented. User corrections and feedback can be captured and used to refine the meta-prompt. This creates a continuous improvement cycle without requiring traditional model retraining.

In performance metrics tracking, the system maintains a log of performance metrics to track improvement over time. The performance metrics include extraction accuracy rates, categorization consistency, and processing time efficiency.

The algorithm creates a continuous feedback loop that allows the system to learn from every document processed, adapt to evolving document formats and industry practices, improve accuracy and efficiency over time, and reduce the need for manual intervention in data extraction and categorization tasks.

This adaptive learning algorithm is designed to be applicable across various industries, including, but not limited to, mineral rights, private credit and syndicated lending. The modular nature of the system allows for easy integration of new industry-specific modules, transfer learning between different document types and industries, and rapid adaptation to new document formats or data points within existing industries.

Embodiments of a graphical user interface of this disclosure may include:

Drag-and-Drop Functionality: Users can easily upload files by dragging and dropping them onto a designated loader area on the website.

Large File Handling: The system automatically detects large files that exceed API size limits. These files are compressed and optimized in real-time, ensuring successful transmission to the API without user intervention.

Upload Progress Visualization: Dynamic temperature bars provide visual feedback on the upload and processing progress of each document.

The graphical user interface of this disclosure may also include a results display having:

Expandable Row Format: Processed documents are initially displayed in a compact row format for easy overview. Each row can be expanded to reveal detailed (JSON) data extracted from the document.

Hierarchical Data Presentation: The expanded view presents data in a structured, easy-to-read format:

1. Summary Section: Displays an overview of the document and shows key-value pairs that are summary in nature.

2. Detailed Data Section: Presents all details extracted from a particular row of data found on the document.

3. Handwritten Text Section: Provides comprehensive information about any handwritten text detected in the document, including location, transcription, description, and contextual information.

In embodiments, users have the ability to recategorize documents based on document type and document producer (such as operator/owner, law firm). After recategorization, users can initiate reprocessing of the document to obtain more accurate results. Each document row may include a dedicated button for CSV download, enabling users to easily export extracted data for use in other systems or for further analysis.

The interface of this disclosure is designed with user-friendly principles, ensuring that both technical and non-technical users can navigate the system effectively. The system provides immediate visual feedback for user actions, enhancing the overall user experience and reducing uncertainty. The interface is scalable, designed to handle both single document uploads and batch processing scenarios efficiently. In embodiments, the system adheres to web accessibility standards, ensuring that users with diverse needs can interact with the interface effectively.

Document uploading and processing may occur asynchronously, allowing users to continue interacting with the system while documents are being processed. For users with large numbers of processed documents, the interface employs lazy loading techniques to ensure swift initial page load times and smooth scrolling through results.

In embodiments, the system automatically identifies documents that cannot be properly processed or categorized. This may include documents that have no discernable text on them. When an un-processable document is detected, the system generates a clear error message for the user. Users are provided with the ability to manually intervene when automatic processing fails, including options to manually select or change the document category and initiate reprocessing.

Embodiments may include confidence level reporting. For each extracted data point, the system assigns a confidence score. The user interface incorporates visual cues to represent confidence levels. The system allows for the configuration of confidence level thresholds to determine when to alert users to potential data extraction issues. When extracted data falls below the configured confidence threshold, the system generates alerts. In addition to individual data point confidence scores, the system provides an aggregate confidence score for each processed document.

The system may also include user-driven error correction. The interface provides users with the ability to edit extracted data directly. All user edits are logged by the system, creating an audit trail of changes. User corrections are fed back into the system's machine learning models, creating a continuous improvement cycle.

System monitoring and reporting may include error rate tracking, performance dashboards, and anomaly detection. The system maintains statistics on error rates and types of errors encountered. Administrative users have access to dashboards showing system performance metrics. The system employs anomaly detection algorithms to identify unusual patterns in document processing or data extraction.

In embodiments, the system incorporates robust security measures and compliance features to meet the stringent requirements of the oil and gas, private credit, and syndicated lending industries, as well as other industries such as, alternative energy, healthcare, education, legal, logistics, real estate, and construction. The security measures and compliance features include end-to-end encryption for all data in transit and at rest; role-based access control to ensure appropriate data access; compliance with industry-specific regulations (e.g., Sarbanes-Oxley Act, GDPR); regular security audits and penetration testing; and detailed audit trails for all system actions and data modifications.

The system is designed to seamlessly integrate with existing industry-specific software and databases. The system includes APIs for data exchange with common industry software (e.g., accounting systems, land management software; support for standard data formats used in the oil and gas industry (e.g., Professional Petroleum Data Management Association ("PPDM"), Petroleum Industry Data exchange ("PIDX")); ability to import and export data in various formats (e.g., JSON, XML, CSV, XLS); and integration with geospatial information systems for location-based document processing.

To handle the large volumes of documents typical in these industries, the system employs advanced scalability and performance features including cloud-based architecture for easy scaling of computing resources; distributed processing capabilities for handling large batch uploads; caching mechanisms to improve response times for frequently accessed data; and optimized database queries for fast retrieval of processed document data.

The system offers extensive customization options to cater to the unique needs of different companies within the target industries by including customizable document templates for industry-specific document types; configurable data extraction rules based on company-specific nomenclature; adjustable confidence thresholds for different types of data or documents; and custom report generation tailored to specific company or regulatory requirements. Building upon these customization capabilities, the system extends its functionality to provide comprehensive title verification and assurance services, as shown in the following section focused on property rights management.

In embodiments, the system extends its intelligent document processing capabilities to perform comprehensive title verification. Using the oil and gas industry as an example, the title verification process involves high volume image processing, enhanced OCR and document categorization, tailored data extraction, and ownership claim construction. The system can ingest large volumes of photographed documents from courthouses, including deeds, leases, quit claims, death certificates, and affidavits. Utilizing advanced OCR techniques and the AI-powered document analysis engine, the system accurately categorizes each document type relevant to property ownership. The adaptive prompting is extended with industry-specific prompts designed to extract key information from oil and gas property documents, including: start and end dates of lease; grantor and grantee information; amount of acres leased or sold; specific rights granted or retained; and royalty percentages and terms. An algorithm analyzes the extracted data points to construct a comprehensive ownership chain and generate an opinion of ownership.

Building upon the title verification process, in embodiments the system offers a novel "Mineral Rights Assurance" product including automated risk assessment, customized coverage, dynamic pricing, and integration with industry partners. The system uses machine learning algorithms to assess the completeness and consistency of the ownership chain, identifying potential gaps or conflicts. Based on the risk assessment, the system generates a tailored assurance product that covers specific aspects of mineral rights ownership. Utilizing the confidence scores from the error handling and quality assurance system, the pricing for the assurance product is dynamically calculated based on the perceived risk and completeness of available information. The system can integrate with established insurance and underwriting partners to manage risk and provide backing for the assurance product.

In embodiments, the system provides ongoing monitoring and updates to the Mineral Rights Assurance product by way of real-time document ingestion, ownership chain updates, and notifications. As new documents are filed or become available, they are automatically ingested and processed by the system. The system continuously updates the ownership chain based on new information, ensuring the assurance product remains current. Stakeholders are automatically notified of significant changes or potential issues affecting the assured mineral rights.

The system leverages blockchain technology, to create an immutable record of property ownership. In embodiments, the system utilizes a permissioned blockchain framework to record and manage ownership details. This provides enhanced privacy, scalability, and flexibility compared to public blockchains. The system develops and implements smart contracts to facilitate ownership transfers, record keeping, and other key functions. Access control is provided by creating separate channels or partitions for different types of transactions or different groups of participants, enhancing privacy and scalability. The blockchain's private data storage capabilities are used to store sensitive ownership details that should only be accessible to authorized parties. The system may include an efficient consensus mechanism suitable for permissioned networks, offering quick finality in transactions. The system maintains a complete, tamper-proof history of ownership changes on the blockchain, with the ability to easily query and audit the ledger. Built-in identity management features ensure that only authorized parties can view and modify ownership records. The system allows for the creation of fractional ownership tokens, enabling smaller investors to participate in the market.

As an example of the use of digital assets ("tokens") and blockchain technology, the system may create, value, and burn a token (e.g., $GUSHERS), that would exist in a limited supply, that can be utilized to facilitate transactions related to oil and gas properties and data. In embodiments, the system Issues a fixed supply of tokens on the blockchain protocol that can be sold and distributed to participants in the oil & gas industry. The fixed supply will initially be set to mirror the quantity of the asset of interest—in this example—the amount of oil in the U.S. Each token will have an issuance price, followed by a market price once trading begins on secondary exchanges, that will fluctuate based on supply and demand for the services in our oil & gas ecosystem. Demand for the token will come from participants that want to purchase data or pay for services related to property transactions while supply will come from the sale of tokens, distribution to contributors of oil & gas documents (owners of wells), and other incentive mechanisms. Implement a quarterly token burning process based on updated geological surveys. Token burning will limit supply thereby impacting the supply/demand and prices of the token. The more scarce or plentiful oil becomes, the more scarce or plentiful the token will become.

The system employs blockchain technology to securely record document verification results and provide the infrastructure for asset management. The implementation may utilize established enterprise-grade protocols the same or similar to *Hedera* Hashgraph or Avalanche, selected for their suitability in document verification applications.

In some embodiments, the system may implement a *Hedera*-like protocol that leverages Asynchronous Byzantine Fault Tolerance ("ABFT") consensus; provides fast finality (3-5 seconds) and high throughput; enables secure document verification through cryptographic hashing; and offers enterprise-grade security for transaction processing. In other embodiments, the system may implement an Avalanche-like protocol that utilizes a Snowman consensus protocol with Directed Acyclic Graph ("DAG") structure; offers sub-second finality and high transaction throughput; enables creation of application-specific blockchains optimized for document processing; and provides scalable infrastructure for complex transaction networks.

Regardless of the specific protocol selected, in embodiments the system implements these key blockchain components: document verification, property rights registry, tokenization support, and marketplace infrastructure. Document verification securely anchors document processing results to the blockchain; creates cryptographic hashes of processed documents; records verification timestamps and processing metadata; and enables third-party verification of document authenticity. Property rights registry records verified ownership information on-chain; maintains immutable history of ownership transfers; links ownership records to source documents; and supports various property right types (ownership, leases, royalties). Tokenization support provides secure infrastructure for asset tokenization processes; ensures immutable record-keeping for token issuance and transfers; maintains cryptographic verification of links between tokens and underlying assets; and enables programmable logic for token-based transactions. Marketplace infrastructure provides secure transaction processing for asset exchanges; enables trustless escrow mechanisms; creates permanent, tamper-proof transaction records; and supports complex multi-party transactions with cryptographic security.

In embodiments, the blockchain and tokenization features are tightly integrated with the existing document processing system. Upon completion of the title verification process, the system automatically creates a new record on the blockchain to represent the verified ownership. As the document processing system ingests and analyzes new documents, the blockchain record is updated in real-time to reflect any changes in ownership, utilizing the blockchain's efficient consensus mechanism for quick final. Smart contract functions can be triggered by specific events in the document processing system, such as the discovery of a new lease or change in ownership. The blockchain's ability to reference off-chain data is used to maintain links between the blockchain records and the detailed document analysis stored in the main system database.

In embodiments, the system provides a marketplace for buying, selling, and leasing of assets/properties, leveraging the blockchain's capabilities. Property owners can create listings for their properties directly through the system's interface, with key details recorded on the blockchain. Smart contract-based escrow services can be implemented to facilitate secure transactions between buyers and sellers, with built-in multi-signature approval processes. Property owners can divide and trade fractional ownership of their properties, with each fraction represented as a unique asset on the blockchain. APIs allow integration with external systems, including regulated U.S. exchanges, leveraging the blockchain's interoperability features. The system maintains a comprehensive audit trail of all marketplace activities on the blockchain, ensuring transparency and compliance with regulatory requirements.

Building upon the blockchain infrastructure, in embodiments the system implements a comprehensive asset tokenization framework that enables fractional ownership, improved liquidity, and efficient transfer of property rights based on verified document information. The tokenization implementation provides a flexible framework that includes digital representation of assets, fractional ownership management, token economics, and ownership and transfer rights management. Digital representation of assets creates standardized digital tokens representing whole or fractional ownership; links tokens cryptographically to verified underlying assets; maintains compliance with relevant securities regulations, and supports both fungible and non-fungible token standards as appropriate for the asset type. Fractional ownership management enables division of single assets into multiple ownership shares; maintains accurate ownership records across multiple stakeholders; supports customizable fractionalization parameters based on asset value and market demand; and preserves rights and obligations associated with fractional ownership. Token economics implements supply mechanisms appropriate to the underlying asset; supports various token distribution models (fixed supply, managed supply); enables token burning to adjust supply based on changes in underlying assets; and provides price discovery mechanisms through marketplace integration. Ownership transfer and rights management facilitates secure transfer of ownership rights between parties; records complete history of ownership changes; enforces transfer restrictions based on regulatory requirements; and manages associated rights such as voting, dividends, or royalties.

Embodiments of systems and methods of this disclosure provide a technical solution to the challenges of processing a plurality of unstructured or different structured documents within and among different types of documents that may include information in different forms (e.g., text, picture) and different formats and in different fields, as well as incomplete or missing information. AI or machine learning models, that are trained on documents within an industry and industry-specific applications or domains, as well as across industries and industry applications: categorize or classify, based upon the document's content, the industry domain to which the document belongs; locates, recognizes, and extracts the relevant, industry-specific data fields in the document, including completing missing information in one or more data fields or correcting incorrect or inaccurate information in yet other data fields; converts the extracted data into standard or consistent fields, forms, and formats for use in further data analysis and reporting; decides a confidence level or score to the standard data; and continually improves recognition and extraction capabilities. The learning models are initially and then continually trained to recognize and interpret domain-specific language and formats, enabling the systems and methods of this disclosure to convert complex, disparate documents into an organized, structured data compilation with high accuracy. The structured data can then be anchored to a blockchain to ensure data integrity and provide a verifiable audit trail.

The invention claimed is:

1. A system for processing and extracting information from a plurality of documents, at least a portion of the information contained in each document of the plurality comprising non-standardized data; the system comprising:
    a content server including non-transitory, computer-readable medium containing instructions thereon and including:
        an AI-powered document analysis engine to identify, for each document, a document type and an industry, the AI powered document analysis engine including an operator-specific adaptation corresponding to a pre-determined transaction, the predetermined transaction including ownership interests in at least one asset;
        an adaptive prompting system adapted to generate a tailored data extraction prompt based on the identified document type and the identified industry and extract, from each document by way of the AI-powered document analysis engine, data corresponding to the tailored data extraction prompts, at least a portion of the extracted data being the non-standardized data; and
        a data standardization module adapted to standardize the extracted data to be compliant with a predetermined data field, data type, and data format;
        an asset rights assurance module configured to construct an ownership chain of the at least one asset and provide a risk assessment of the ownership chain, wherein the ownership chain includes the risk assessment of the ownership chain;
    a database in communication with the content server and configured to store the standardized extracted data; and
    a multi-tenant user architecture, the multi-tenant user architecture including a user interface and configured to upload documents of the plurality of documents to the content server, separate and secure the documents of one tenant from those of other tenants, and display the stored standardized extracted data, the ownership chain, and the risk assessment.

2. The system of claim 1, wherein the tailored data extraction prompt comprises an initial prompt and a secondary prompt generated by the initial prompt, the initial prompt including a dynamically generated document-specific extraction prompt, the secondary prompt including an industry specific extraction prompt.

3. The system of claim 1, wherein the database comprises a blockchain.

4. The system of claim 3, wherein the content server configured to create digital tokens representing full and fractional ownership interests in the at least one asset.

5. The system of claim 4, wherein the user interface is configured to view and manage at least a portion of the digital tokens.

6. The system of claim 1, wherein the plurality of documents comprise at least one of mineral rights data, private credit data, or lending data.

7. A method for processing a plurality of documents; one or more of the documents comprising asset data including at least one asset and asset ownership; each document differing from at least one other document of the plurality according to document type, document format, document structure, data type, data format, data field, or some combination thereof; at least a portion of the information contained in each document comprising non-standardized data, the method comprising:

(a) providing a multi-tenant architecture, including a user interface, for uploading the plurality of documents over a network to a content server;

(b) analyzing the uploaded documents on the content server using an AI-powered document analysis engine to identify, for each document, the document type and an industry, the AI powered document analysis engine including an operator-specific adaptation corresponding to a pre-determined transaction;

(c) generating, by way of an adaptive prompting system on the content server, a tailored data extraction prompt based on the identified document type and the identified industry;

(d) extracting, from each document by way of the AI-powered document analysis engine, data corresponding to the tailored data extraction prompt, wherein at least a portion of the extracted data is the non-standardized data;

(e) standardizing the extracted data using a data standardization module on the content server, wherein the standardized extracted data is compliant with a pre-determined data field, data type, and data format;

(f) storing the standardized extracted data in a database in communication with the content server; (g)

(g) providing access, through the user interface, to the stored standardized extracted data;

(i) constructing an ownership chain of the at least one asset, the ownership chain including a risk assessment of the ownership chain;

(j) generating an ownership report based on the constructed ownership chain and the risk assessment;

wherein the content server includes non-transitory, computer-readable medium containing instructions thereon, the instructions when acted on by a processor performing the steps (b) to (e), (i) and (i).

8. The method of claim 7, wherein the tailored data extraction prompt comprises an initial prompt and a secondary prompt generated by the initial prompt, the initial prompt including a dynamically generated document-specific extraction prompt, the secondary prompt including an industry specific extraction prompt.

9. The method of claim 7, wherein the operator-specific adaptation comprises at least one of dynamic prompt generation based on a document producer identification, historical pattern recognition corresponding to a producer-specific document structure, or an adaptive field mapping engine configured to learn document source variation.

10. The method of claim 7, further comprising dynamically generating a new data field based on a content of at least one of the documents.

11. The method of claim 7, further comprising:

(h) selecting, through the user interface, the at least one asset stored in the database.

12. The method of claim 11, wherein the database comprises a blockchain.

13. The method of claim 12, further comprising the instructions, when acted on by the processor:

(k) creating digital tokens representing full and fractional ownership of the at least one asset.

14. The method of claim 13, wherein the user interface is configured to view and manage a corresponding tokenized asset ownership.

15. The method of claim 7, further comprising:

(o) generating, by the content server, a cryptographic hash of the standardized extracted data;

(p) recording the cryptographic hash linked to the standardized extracted data on a blockchain ledger to create a tamper-evident audit trail; and (q) enabling retrieval and verification of the standardized extracted data using the blockchain ledger.

16. The method of claim 7, further comprising the extracting being independent of document format and document structure.

17. The method of claim 7, further comprising the extracting including:

(m) identifying content that is expected but not found in the document; and (n) flagging the missing content.

18. The method of claim 17, further comprising the extracting including completing at least a portion of the missing content based upon a content of another document, the completing comprising standardized data.

19. The method of claim 7, wherein the uploading the documents over the network to the content server does not involve an API.

20. The method of claim 7, further comprising the risk assessment including one or more of assigning a confidence score to the ownership chain; identifying a gap, identifying a conflict, or identifying an inconsistency in the ownership chain; or flagging missing content in the ownership chain.

21. The method of claim 7, further comprising creating an audit trail of data modifications.

22. The method of claim 7, wherein the plurality of documents comprise at least one of mineral rights data, private credit data, or lending data.

23. The method of claim 7, wherein the plurality of documents comprise at least one of alternative energy data, healthcare data, education data, legal data, logistics data, real estate data, or construction data.

24. A method for processing a plurality of documents; each document differing from at least one other document of the plurality according to document type, document format, document structure, data type, data format, data field, or some combination thereof; at least a portion of the information contained in each document comprising non-standardized data, the method comprising:

(a) providing a multi-tenant architecture, including a user interface, for uploading the plurality of documents over a network to a content server;

(b) analyzing the uploaded documents on the content server using an AI-powered document analysis engine to identify, for each document, the document type and an industry, the AI powered document analysis engine including an operator-specific adaptation corresponding to a pre-determined transaction;

(c) generating, by way of an adaptive prompting system on the content server, a tailored data extraction prompt based on the identified document type and the identified industry;

(d) extracting, from each document by way of the AI-powered document analysis engine, data corresponding to the tailored data extraction prompt, wherein at least a portion of the extracted data is the non-standardized data;

(e) standardizing the extracted data using a data standardization module on the content server, wherein the standardized extracted data is compliant with a pre-determined data field, data type, and data format;

(f) storing the standardized extracted data in a database in communication with the content server; and (g) providing access, through the user interface, to the stored standardized extracted data;

wherein the content server includes non-transitory, computer-readable medium containing instructions thereon, the instructions when acted on by a processor performing the steps (b) to (e); the method further comprising:

(h) selecting, through the user interface, the at least one asset stored in the database;

(i) constructing an ownership chain of the at least one asset, the ownership chain including a risk assessment of the ownership chain; and (j) generating an ownership report based on the constructed ownership chain and the risk assessment;

wherein, the instructions when acted on by the processor performing the steps (i) and (j).

25. The method of claim 24, wherein the database comprises a block chain.

26. The method of claim 25, further comprising the instructions, when acted on by the processor:

(k) creating digital tokens representing full and fractional ownership of the at least one asset.

27. The method of claim 26, wherein the user interface is configured to view and manage a corresponding tokenized asset ownership.

28. The method of claim 24, further comprising:

(o) generating, by the content server, a cryptographic hash of the standardized extracted data;

(p) recording the cryptographic hash linked to the standardized extracted data on a blockchain ledger to create a tamper-evident audit trail; and (q) enabling retrieval and verification of the standardized extracted data using the blockchain ledger.

29. The method of claim 24, further comprising the risk assessment including one or more of assigning a confidence score to the ownership chain; identifying a gap, identifying a conflict, or identifying an inconsistency in the ownership chain; or flagging missing content in the ownership chain.

30. The method of claim 24, further comprising creating an audit trail of data modifications.

31. The method of claim 24, wherein the plurality of documents comprise at least one of mineral rights data, private credit data, or lending data.

32. The method of claim 24, wherein the plurality of documents comprise at least one of alternative energy data, healthcare data, education data, legal data, logistics data, real estate data, or construction data.

33. A method for processing a plurality of documents; each document differing from at least one other document of the plurality according to document type, document format, document structure, data type, data format, data field, or some combination thereof; at least a portion of the information contained in each document comprising non-standardized data, the method comprising:

(a) providing a multi-tenant architecture, including a user interface, for uploading the plurality of documents over a network to a content server;

(b) analyzing the uploaded documents on the content server using an AI-powered document analysis engine to identify, for each document, the document type and an industry, the AI powered document analysis engine including an operator-specific adaptation corresponding to a pre-determined transaction;

(c) generating, by way of an adaptive prompting system on the content server, a tailored data extraction prompt based on the identified document type and the identified industry;

(d) extracting, from each document by way of the AI-powered document analysis engine, data corresponding to the tailored data extraction prompt, wherein at least a portion of the extracted data is the non-standardized data;

(e) standardizing the extracted data using a data standardization module on the content server, wherein the standardized extracted data is compliant with a predetermined data field, data type, and data format;

(f) storing the standardized extracted data in a database in communication with the content server; and (g) providing access, through the user interface, to the stored standardized extracted data;

wherein the content server includes non-transitory, computer-readable medium containing instructions thereon, the instructions when acted on by a processor performing the steps (b) to (e); the method further comprising:

(o) generating, by the content server, a cryptographic hash of the standardized extracted data;

(p) recording the cryptographic hash linked to the standardized extracted data on a blockchain ledger to create a tamper-evident audit trail; and (q) enabling retrieval and verification of the standardized extracted data using the blockchain ledger.

34. The method of claim 33 further comprising:

(h) selecting, through the user interface, the at least one asset stored in the database;

(i) constructing an ownership chain of the at least one asset, the ownership chain including a risk assessment of the ownership chain; and (j) generating an ownership report based on the constructed ownership chain and the risk assessment;

wherein, the instructions when acted on by the processor performing the steps (i) and (j).

35. The method of claim 32, further comprising the risk assessment including one or more of assigning a confidence score to the ownership chain; identifying a gap, identifying a conflict, or identifying an inconsistency in the ownership chain; or flagging missing content in the ownership chain.

36. The method of claim 33, further comprising the instructions, when acted on by the processor:

(k) creating digital tokens representing full and fractional ownership of the at least one asset.

37. The method of claim 36, wherein the user interface is configured to view and manage a corresponding tokenized asset ownership.

38. The method of claim 33, wherein the plurality of documents comprise at least one of mineral rights data, private credit data, or lending data.

39. The method of claim 33, wherein the plurality of documents comprise at least one of alternative energy data, healthcare data, education data, legal data, logistics data, real estate data, or construction data.

* * * * *